Figure 1:
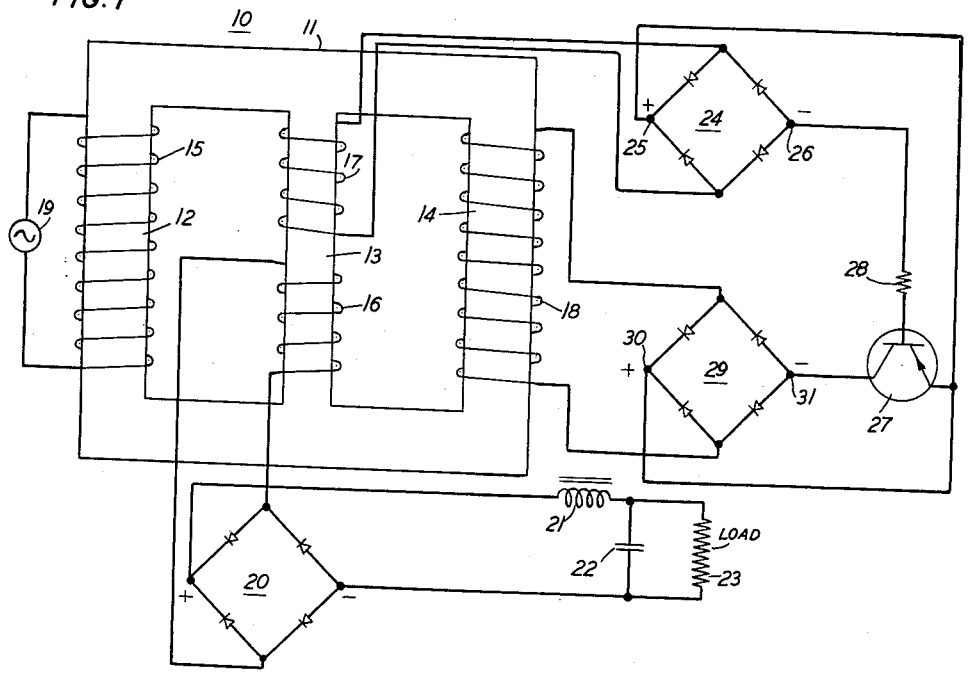

Feb. 26, 1963

R. E. KUBA 3,079,546

CURRENT SUPPLY APPARATUS

Filed March 29, 1960

INVENTOR
R. E. KUBA
BY
G. F. Heurman
ATTORNEY

United States Patent Office 3,079,546
Patented Feb. 26, 1963

3,079,546
CURRENT SUPPLY APPARATUS
Richard E. Kuba, Columbus, Ohio, assignor, by mesne assignments, to North Electric Company, Galion, Ohio, a corporation of Ohio
Filed Mar. 29, 1960, Ser. No. 18,414
4 Claims. (Cl. 323—50)

This invention relates to current supply apparatus and more particularly to apparatus for controlling the supply of rectified alternating current to a load to maintain the load voltage substantially constant.

An object of the invention is to provide means responsive to flux changes in a first of two parallel flux paths for opposing flux changes in the second flux path.

Another object is to provide improved apparatus comprising a saturable transformer for controlling the supply of current from an alternating-current supply source to a load.

A feature of the invention is the provision of two parallel paths for flux supplied thereto from a source of alternating flux, a first of the flux paths being saturated during a portion of each half cycle period of the alternating flux, and means responsive to change of flux in the first flux path for opposing change of flux in the second flux path.

In specific embodiments of the invention, herein shown and described for the purpose of illustration, there is provided a core of magnetic material comprising three legs. A first and a second of the three legs are in a first magnetic circuit and the first and third legs are in a second magnetic circuit. A first alternating magnetomotive force is set up in the first leg by supplying alternating current from a supply source to a first winding on the first leg. The second leg preferably comprises a magnetic material having a substantially square hysteresis loop and has a cross-sectional area small enough to cause the second leg to saturate during each half cycle period of the alternating magnetomotive force. A second and a third winding are wound on the second leg. Current is supplied from the second winding to the input of a first rectifier which, in turn, supplies current through a ripple filter to a load. The third winding supplies current to the input of a second rectifier which, in turn, supplies current to the base-emitter path of a transistor. A fourth winding on the third leg is connected to the input of a third rectifier the output of which is connected to the emitter-collector path of the transistor.

When the second leg is unsaturated, the changing flux therein causes rectified current to be supplied to the emitter-base path of the transistor to make it substantially fully conducting. As a result, the fourth winding on the third leg is effectively short-circuited through the third rectifier and the emitter-collector path of the transistor. The current in the fourth winding thus sets up a magnetomotive force which opposes the magnetomotive force due to current supplied to the first winding in the second magnetic circuit. The flux in the second magnetic circuit is thus relatively small when the second leg is unsaturated. Saturation of the second leg causes the voltage across the third winding to be reduced substantially to zero, thus causing the emitter-base current of the transistor to be reduced substantially to zero. As a result, the transistor is changed from a fully conducting state to a cut-off state, thus effectively opening the circuit for the fourth winding. Thus, when the second leg saturates to substantially prevent flux changes in the first magnetic circuit, the opposing magnetomotive force in the third leg is substantially removed to permit the flow of flux in the second magnetic circuit.

As the voltage of the supply source increases, the time required for saturating the second leg of the core decreases, and vice versa. When the second leg saturates, the voltage across the second transformer winding will be reduced to zero. If the voltage pulses across the second winding are plotted with the instantaneous voltages as ordinates and time as the abscissa, the area of the successive pulses will remain constant irrespective of voltage changes of the supply source. The constant area pulses are averaged by the rectifier-filter to maintain a substantially constant voltage across the load when the frequency of the supply source is constant.

Figure 2:
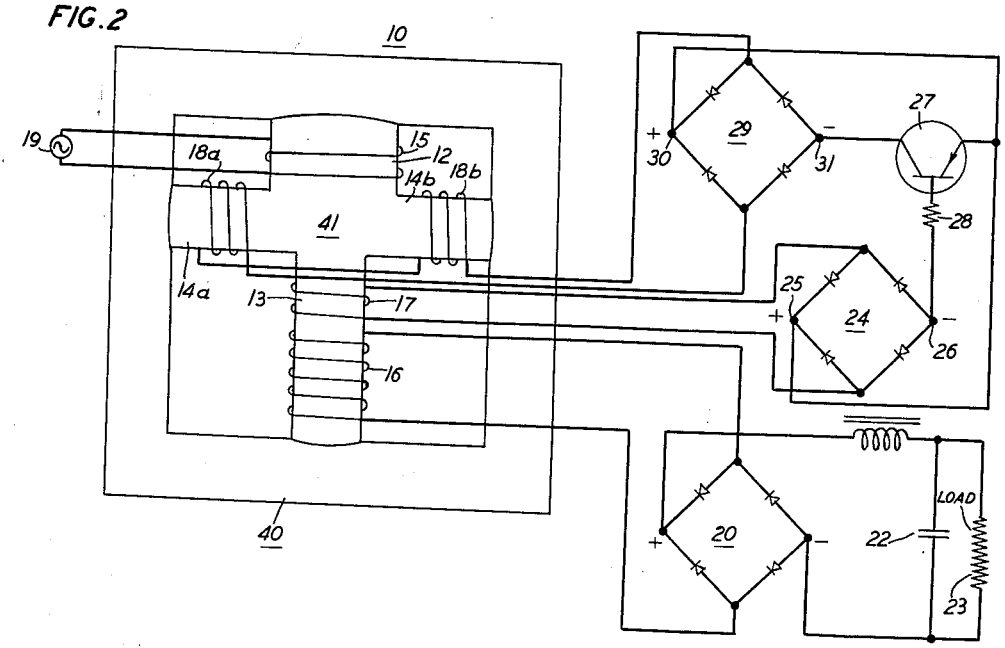

The invention will now be described in greater detail with reference to the accompanying drawing in which:

FIG. 1 is a schematic view of a current supply circuit embodying the invention; and FIG. 2 is a schematic view of a modification of the current supply circuit shown in FIG. 1.

Referring now to FIG. 1 of the drawing, there is provided a transformer 10 having a core 11 of magnetic material comprising three legs 12, 13 and 14. A winding 15 is wound on the leg 12, windings 16 and 17 are wound on the leg 13, and a winding 18 is wound on the leg 14. The leg 13 is preferably constructed of a magnetic material having a substantially square hysteresis loop. The cross-sectional area of leg 13 is less than that of the leg 12 and the sum of the cross-sectional areas of legs 13 and 14 is equal to or greater than that of the leg 12.

Current from a source of alternating current 19 having a substantially constant frequency and a voltage which may vary is supplied to the winding 15. Winding 16 is connected to the input terminals of a bridge rectifier 20 having positive and negative output terminals which are connected through a ripple filter comprising a series inductive reactor 21 and a shunt condenser 22 to a load 23. Winding 17 is connected to the input terminals of a bridge rectifier 24 having positive and negative output terminals 25 and 26, respectively. There is provided a p-n-p type transistor 27 having an emitter, a collector and a base. The positive rectifier terminal 25 is connected to the emitter of transistor 27 and the negative rectifier terminal 26 is connected through a resistor 28 to the base of the transistor. Winding 18 is connected to the input terminals of a bridge rectifier 29 having positive and negative output terminals 30 and 31, respectively. The positive terminal 30 is connected to the emitter of transistor 27 and the negative terminal 31 is connected to the collector of the transistor.

It will be observed that there are formed two magnetic circuits one of which comprises the legs 12 and 13 and the other of which comprises the legs 12 and 14. Alternating current supplied to winding 15 causes a magnetomotive force to be set up in leg 12. The resulting alternating flux in leg 13 causes current to flow from winding 16 into the input of rectifier 20 and the rectified output current is supplied through the ripple filter 21, 22 to the load 23. The leg 13 of the transformer saturates during each half cycle period of the alternating magnetomotive force to cause the voltages across windings 16 and 17 to decrease to zero. As the peak voltage of the supply source 19 increases, the peak amplitude of the successive voltage pulses across winding 16 increases, and vice versa. However, the leg 13 saturates earlier, and, therefore, the voltage pulse across winding 16 terminates earlier, in a half cycle period when the supply voltage is large, than when the supply voltage is relatively small. The area enclosed by a curve connecting the instantaneous voltages and the time axis is the same for each voltage pulse across the winding 16. The circuit comprising the rectifier 20 and the filter 21, 22 averages the voltage impressed upon the rectifier input from the winding 16 to maintain the direct voltage across the load 23 substantially constant.

When the leg 13 is unsaturated, the changing flux in leg 13 also sets up a voltage across winding 17 to cause current to be supplied to the input of rectifier 24. As a result current is supplied from the positive terminal of rectifier 24, into the emitter and out of the base of transistor 27 and through resistor 28 to the negative rectifier terminal. This current flow through the emitter-base path of the transistor makes the transistor substantially fully conducting. Changing flux in leg 14 sets up a voltage in winding 18 to cause current to be supplied to the input of rectifier 29. As a result current is supplied from the positive terminal of rectifier 29 into the emitter and out of the collector of transistor 27. Thus, while leg 13 is unsaturated, the winding 18 is connected to a low resistance current path, that is, the winding is substantially short-circuited. The magnetomotive force set up in leg 14 due to the current in winding 18 opposes the magnetomotive force due to the current supplied to winding 15 in the magnetic circuit comprising legs 12 and 14. Thus, while the leg 13 is unsaturated, substantially all the flux due to the current is winding 15 flows through the magnetic circuit comprising legs 12 and 13 and the flux in the magnetic circuit comprising legs 12 and 14 is negligibly small. The transformer thus operates efficiently to supply current to the load circuit comprising the rectifier-filter 20, 21, 22 and the load 23.

When the leg 13 saturates during each half cycle period of the alternating magnetomotive force, the voltage across winding 17 is reduced to zero, thereby effectively interrupting the emitter-base current of transistor 27 and changing the transistor 27 from a fully conducting state to a cut-off state. As a result, the resistance of the circuit of winding 18 is greatly increased, that is, the winding 18 is substantially open-circuited and the current in winding 18 is reduced to a negligible value or zero. The opposing magnetomotive force due to current in winding 18 is thus substantially removed. Therefore, when the first magnetic circuit comprising legs 12 and 13 is effectively interrupted because of the saturation of leg 13, the second magnetic circuit is effectively completed by removing the countermagnetomotive force due to current in winding 18. The reactance of winding 15 is thus maintained sufficiently high to prevent the flow of excessive current from the source 19 to winding 15.

The modified embodiment of the invention shown in FIG. 2 functions similarly to the embodiment of FIG. 1 and the corresponding parts are designated by the same numerals. In FIG. 2, the transformer 10 comprises O-shaped laminations 40 into which are pressed T-shaped laminations 41. The T-shaped laminations form a leg 12 on which winding 15 is wound, a leg 13 upon which windings 16 and 17 are wound and legs 14a and 14b upon which windings 18a and 18b, respectively, are wound. The leg 13 is made of magnetic material having an approximately square hysteresis loop. The width of leg 13 is less than the width of leg 12 and the sum of the widths of legs 14a, 14b and 13 is equal to or greater than the width of leg 12. The width of the O-shaped core section 40 is equal to or greater than one-half the width of leg 12. Winding 18a on leg 14a and winding 18b on leg 14b are connected in series aiding, that is, so that current flowing through these windings when they are short-circuited will produce magnetomotive forces in legs 14a and 14b respectively which oppose any magnetomotive force acting across these legs due to current flowing in winding 15 on leg 12.

If leg 13 is unsaturated and flux is generated in leg 12 by current flowing in winding 15, this flux will return to leg 12 by way of a path comprising leg 13 and the left-hand and right-hand portions of the O-shaped laminations 40, as viewed in the drawing. This flux will induce a voltage in winding 17 on leg 13 which will cause rectified current to flow in the emitter-base path of transistor 27 to cause full conduction in the transistor. The transistor when made fully conducting shorts the output of rectifier 29 to produce an effective short-circuit on windings 18a and 18b and therefore effectively interrupts any flow of magnetic flux in legs 14a and 14b. Now, if leg 13 becomes saturated, there can be no appreciable change of flux in leg 13 and hence no voltage induced in winding 17. This condition reduces the emitter-base current of transistor 27 to nearly zero, interrupting conduction in the transistor and effectively open-circuiting windings 18a and 18b, thereby producing a magnetic condition in legs 14a and 14b such that flux produced in leg 12 by current flowing in winding 15 returns to leg 12 by a path comprising legs 14a and 14b and the left-hand and right-hand portions of the O-shaped laminations 40.

It will be observed, therefore, that there is formed a first magnetic circuit comprising legs 12 and 13 and the left-hand portion of the O-shaped laminations 40 and a second magnetic circuit comprising legs 12 and 14a and a left-hand portion of laminations 40. When leg 13 is unsaturated, flux due to current in winding 15 flows in the first magnetic circuit and is substantially prevented from flowing in the second magnetic circuit. When leg 13 is saturated to substantially prevent change of flux in the first magnetic circuit, leg 14a is conditioned to permit the flow of changing flux in the second magnetic circuit. It will also be observed that there are formed a third magnetic circuit, like the first magnetic circuit, comprising legs 12 and 13 and the right-hand portion of the O-shaped laminations 40 and a fourth magnetic circuit, like the second magnetic circuit, comprising legs 12 and 14b and a right-hand portion of laminations 40. The third and fourth magnetic circuits function in the same way as the first and second magnetic circuits, as described above.

What is claimed is:

1. Current supply apparatus comprising a core of magnetic material having a first, a second and a third magnetic material forming said second leg having a leg, the magnetic material forming said second leg having a substantially square hysteresis loop, a first winding on said first leg for setting up in said first leg an alternating magnetomotive force when current from a source of alternating current is supplied to said first winding, the alternating flux in said second leg resulting from said alternating magnetomotive force saturating said second leg during a portion of each half cycle period of said alternating flux, flux flowing in said third leg during said portion of each half cycle period when said second leg is saturated, a second winding on said second leg, a third winding on said third leg, and means responsive to current induced in said second winding during the portion of each half cycle period when said second leg is unsaturated for completing an alternating-current circuit including said third winding, the resulting alternating current flowing in said third winding setting up in said third leg an alternating magnetomotive force which opposes changes of flux in said third leg.

2. Apparatus for supplying current from an alternating-current supply source to a load circuit comprising a core of magnetic material having a first, a second and a third leg, a first winding on said first leg connected to said supply source, said second leg comprising a substantially square hysteresis loop magnetic material, a second and a third winding on said second leg, a fourth winding on said third leg, the alternating flux in said second leg resulting from the alternating current supplied to said first winding saturating said second leg during a portion of each half cycle period of said alternating flux, a first and a second rectifier each having an input and an output, means for connecting said second winding to said load circuit, a transistor having an emitter, a collector and a base, means for connecting said third winding to the input of said first rectifier, means for connecting the output of said first rectifier to the emitter-base path of said transistor with a polarity to cause current to flow through said emitter-base path to make said transistor conductive when said first rectifier is energized by current from said third winding, means for connecting said fourth winding to the input of said second rectifier, and means for connecting the output of said second rectifier to the emitter-collector path of said transistor.

3. Apparatus for supplying current from an alternating-current supply source to a load circuit comprising a laminated core of magnetic material having an outer O-shaped portion and an inner T-shaped portion, said inner portion comprising a first, a second, a third and a fourth leg, a first winding on said first leg connected to said alternating-current supply source, a second and a third winding on said second leg, a fourth winding on said third leg, and a fifth winding on said fourth leg, said second leg comprising a substantially square hysteresis loop magnetic material, the width of said second leg being less than the width of the first leg, the sum of the widths of the second, third and fourth legs being at least as large as the width of said first leg, the width of the outer core portion being at least as large as one-half the width of the first leg, the alternating flux in said second leg resulting from the alternating current supplied to said first winding saturating said second leg during a portion of each half cycle period of said alternating flux, a first and a second rectifier each having an input and an output, means for connecting said second winding to said load circuit, a transistor having an emitter, a collector and a base, means for connecting said third winding to the input of said first rectifier, means for connecting the output of said first rectifier to the emitter-base path of said transistor with a polarity to cause current to flow through said emitter-base path to make said transistor conductive when said first rectifier is energized by current from said third winding, means for connecting said fourth and fifth windings in series to the input of said second rectifier, and means for connecting the output of said second rectifier to the emitter-collector path of said transistor.

4. In combination, a first and a second flux path connected in parallel, means for impressing across said flux paths an alternating magnetomotive force for producing in said first flux path flux which changes from saturation in one direction to saturation in the opposite direction during intermittent periods occurring in synchronism with successive half cycle periods of said alternating magnetomotive force and which flux is relatively constant during intervals separating said periods, and means responsive to the flux in said first flux path for opposing change of flux in said second flux path during said periods and permitting change of flux in said second flux path during said intervals.

References Cited in the file of this patent
UNITED STATES PATENTS

| | | |
|---|---|---|
| 1,835,115 | Kouyoumjian | Dec. 8, 1931 |
| 2,364,532 | Huge | Dec. 5, 1944 |
| 2,495,783 | Sorensen | Jan. 31, 1950 |
| 2,693,567 | Yeager | Nov. 2, 1954 |
| 2,739,282 | Evans | Mar. 20, 1956 |
| 2,800,571 | Glenn et al. | July 23, 1957 |
| 2,904,743 | McClain | Sept. 15, 1959 |
| 2,989,686 | Pinckaers et al. | June 30, 1961 |